United States Patent [19]
Sirola

[11] 3,775,818
[45] Dec. 4, 1973

[54] TOOL HOLDER WITH CUTTER CLAMPING MEANS

[76] Inventor: Frank Sirola, 419 Getty Ave., Clifton, N.J. 07015

[22] Filed: Sept. 14, 1972

[21] Appl. No.: 289,004

[52] U.S. Cl. ................................................ 29/96
[51] Int. Cl. ............................................ B26d 1/00
[58] Field of Search ........................... 29/96, 95, 97

[56] References Cited
UNITED STATES PATENTS

| | | | |
|---|---|---|---|
| 3,599,303 | 8/1971 | Sletten | 29/96 X |
| 3,543,363 | 12/1970 | Diemond | 29/96 |
| 3,531,842 | 10/1970 | Bowling | 29/96 |

*Primary Examiner*—Leonidas Vlachos
*Attorney*—Alan W. Borst

[57] ABSTRACT

The invention embodies a tool holder in which a spring plate is slidably mounted and which plate includes oppositely disposed spring portions, one of which portions is formed with a seat adapted to receive a cutter element in projecting relation thereon and the other portion having bearing engagement against the cutter element when disposed on the seat. A slide member is also slidably mounted in the tool holder for movement into and out of camming engagement with said spring plate for tightening the cutter element between said spring portions and a screw threadably engaging said tool holder and said slide member is provided for manually turning thereof in opposite directions for moving said slide member into and out of said camming engagement.

3 Claims, 6 Drawing Figures

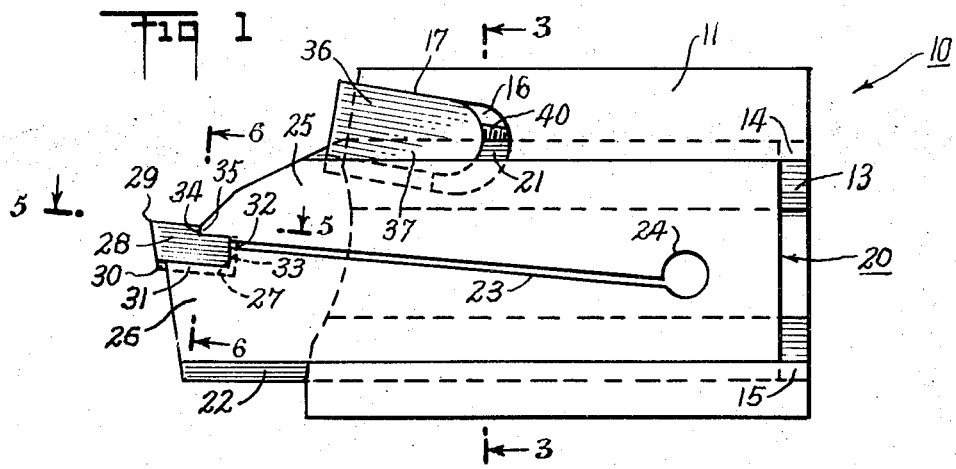
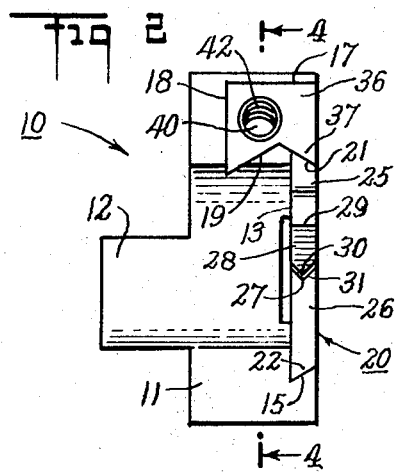
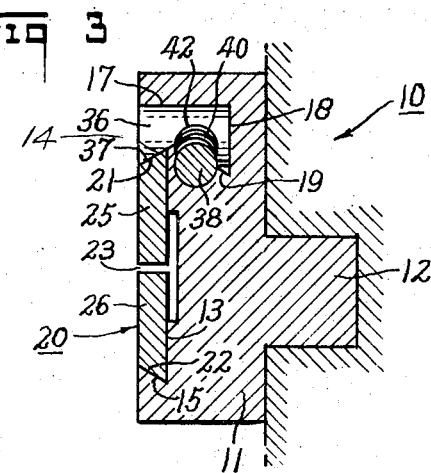
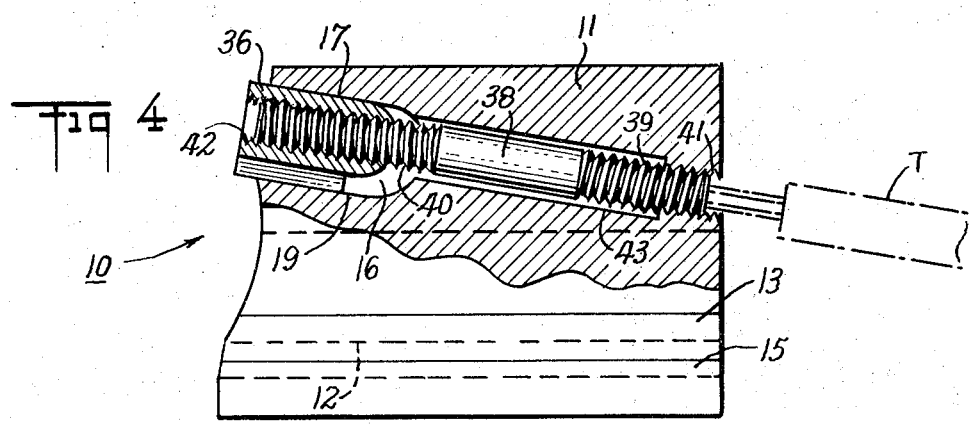
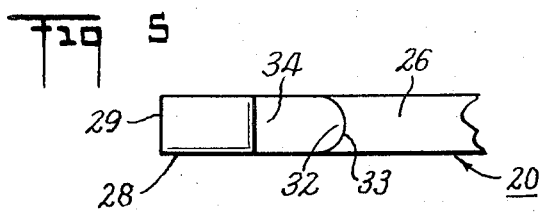
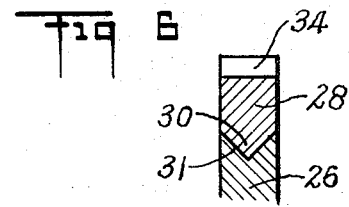

3,775,818

TOOL HOLDER WITH CUTTER CLAMPING MEANS

This invention relates to cutting tools for cutting metal stock and the like arranged in a lathe or planer and the invention has particular reference to a tool holder constructed to replaceably mount a cutter element in position for presenting the cutter element against the stock to be cut.

In the art relating to cutting tools, it has been the practice to weld or braze the cutter element in position on the tool holder. This arrangement necessitates the removal of the welding or brazing material in order to replace the cutter element.

The present invention has in view a tool holder which is constructed and arranged to permit of the convenient emplacement of the cutter element in position thereon and the removal therefrom and which eliminates the necessity of welding or brazing the cutter element in position in the tool holder.

Another object of the invention is the provision of a tool holder having supporting means for the cutter element consisting of opposite spring portions of a spring blade replaceably mounted on the holder and between which spring portions the cutter element is replaceably mounted.

Another object of the invention is to provide a spring blade of forked or bifurcated formation providing said opposite spring portions and with a notched seat on one of said portions for receiving the cutter element in tensioned engagement between the said portions.

Still another object of the invention is to provide a tool holder with reciprocating slide means for clampingly securing the spring blade in position on the holder and the cutter element in secured positions between said spring portions.

With the foregoing and other objects in view, reference is now made to the following specification and accompanying drawing in which:

FIG. 1 is a side view of a tool holder constructed in accordance with the invention and showing the spring plate in position thereon and the cutter element in secured position between the spring portions of said spring plate;

FIG. 2 is a view in elevation of the forward end of the holder and parts shown in FIG. 1;

FIG. 3 is a vertical sectional view taken on line 3—3 of FIG. 1;

FIG. 4 is an enlarged fragmentary longitudinal sectional view taken opproximately on line 4—4 of FIG. 2;

FIG. 5 is an enlarged fragmentary sectional view taken on line 5—5 of FIG. 1; and FIG. 6 is an enlarged sectional view taken on line 6—6 of FIG. 1.

Referring to the drawings by characters of reference, the tool holder 10 includes a rectangular shaped metal block 11 having a shank 12 at one side for securement of the holder in a tool post and the like of a lathe. On the opposite side from the shank 12, the block 11 is formed with a dovetail slot 13 between the upper and lower longitudinally extending bevelled walls 14 and 15. The said slot 13 opens through the ends and outer face of the block. The block 11 is also formed with a recess 16 which opens through the forward end thereof and communicates with the dovetail slot 13 at its forward end. The recess 16 extends downwardly and inwardly in angular relation to the slot 13 and is formed with a top wall 17, an inner side wall 18 and a bottom wall 19 of grooved formations, the outer side of the said recess being open.

Arranged in the slot 13 is a spring plate 20 having longitudinally extending upper and lower bevelled edges 21 and 22 which slidably fit the recesses formed by the bevelled walls 14 and 15. The spring plate 20 is formed with a longitudinally extending narrow slit 23 which opens through the forward end thereof and terminates at its inner end in an enlarged opening 24 adjacent the inner end of the plate. The slit 23 bifurcates the plate 20 forming the furcations or oppositely disposed upper and lower spring portions 25 and 26. As illustrated, the slit 23 extends downwardly in angular relation to the dovetail slot 13 which latter slot extends horizontally of the block 11. The said spring portion 26 is cut away at its forward end forming a seat 27 for a cutter element 28. The spring prtions 25 and 26 project from the dovetail slot 13 forwardly of the holder 10 and with the cutter element 28 projecting forwardly of the lower spring portion 26 and being formed with a cutting edge or lip 29.

The cutter element 28 and the seat 27 have their contacting lower faces formed with interfitting rib and groove 30 and 31 extending longitudinally thereof. The rear face of the cutter element and the inner face of the seat 27 are also formed with interfitting rib and groove 32 and 33 respectively. The upper face of the cutter element is of the upper spring portion 35 of the said spring plate 20 and with the spring portions 25 and 26 being spaced apart and clamping the cutter element 28 on the seat 27 by the inward contraction of said spring portions.

A slide 36 fittingly engages the recess 16 in the block 11 having a top wall conforming to the top wall 17 of the recess, an inner side wall conforming to the inner side 18 thereof and a bottom face portion of angular formation fitting the bevelled face portions 19 for retaining the slide in said recess. Outwardly of the bevelled face portion 19 the slide is formed with an angularly disposed horizontally extending wall portion 37 which fits the bevelled edge 21 of the plate 20.

The slide 36 is moved longitudinally within the recess 16 by means of a screw 38 having a left hand threaded inner end portion 39 and a right hand threaded outer end portion 40 which portions engage threaded openings 41 and 42 in the block 11 and slide 36 respectively. The opening 41 extends through the block 11 to permit of the insertion of a tool T for engagement with the end of the screw for turning the same. It will be understood that turning the screw 38 in one direction moves the slide 36 rearwardly so as to tighten the slide against the spring portion 25 of the spring plate 20 to thereby tighten the cutter element on the seat 27. Convertly, turning the screw 38 in the opposite direction moves the slide 36 forwardly so as to loosen the slide on the spring portion 21 whereby the cutter element may be slid forwardly on the rib and groove engagement 30 and 31 out of the seat 27 for replacement.

The longitudinal axis of the screw 38 in the bore 43 of the block 11 as well as the threaded openings 41 and 42 in the block 11 and slide 36 and the longitudinal axis of the bore 43 are in substantially parallel alignment and are inclined slightly to the slot 23. Thus, when the slide 36 is moved inwardly in the recess 16, the slide is impinged against the spring portion 25 of the spring plate 20 so as to tighten the cutter element 28 on the seat 27.

The cutter element may be of any desired material such as carbide or tungsten carbide and the like. The cutter element may be readily secured on the seat 27 without chattering and may be expeditiously removed for replacement.

What is claimed is:

1. A tool holder for mounting a cutter element consisting of a metal block having a longitudinally extending slot in one face thereof and an inwardly and downwardly extending recess at one end, a spring plate slotted longitudinally to provide upper and lower spring portions, said spring plate be slidable mounted in said slot in said block to dispose said spring portions in projecting relation forwardly of said block, said lower spring portion being recessed to provide a seat its forward end adapted to recess a cutter element in forwardly projecting relation, said upper spring portion extending partly over said cutter element when positioned on said seat, a slide mounted in said recess in said block and movable into and out of impinging engagement with said upper spring portion, and screw means mounted in said block and having threaded engagement at one end with said slide and with said block at the other end and adapted to be turned in one direction for moving said slide in one direction against said upper spring plate for securing the cutter element on said seat and to be turned in the opposite direction for releasing the cutter element from secured position on said seat.

2. A tool holder for mounting a cutter element consisting of a block having a longitudinally extending slot in one face thereof and an inwardly extending recess at one end, a longitudinally slotted spring plate slidably mounted in said slot in said block, said slotted formation of said spring plate providing oppositely disposed upper and lower spring portions, said lower spring portion being recessed to provide a seat at its forward end adapted to receive a cutter element in forwardly projecting relation, said upper spring portion extending in overlying relation with the cutter element when positioned on said seat, a slide mounted in said recess in said block and disposed in bearing engagement with said upper spring portion, said slide being movable in angular relation to the longitudinal axis of said spring plate, and screw means having threaded engagement at one end with said slide and with said block at the other end for moving said slide into and out of impinging engagement with said upper slide portion for securing the cutter element in position on said seat and for releasing the same from secured position respectively.

3. A tool holder for mounting a cutter element consisting of a metal block, a spring plate slidably mounted on said block to project forwardly thereof, said spring plate having oppositely disposed spring portions arranged in narrowly spaced relation, one of said spring portions being notched to provide a seat adapted to receive a cutter element thereon in forwardly projecting relation between said spring portions, a slide mounted for reciprocatory movement in a recess in said block and disposed in angular relation with said spring plate and in bearing engagement therewith, and screw means threadably engaging said block at one end and said slide at the other end and adapted to be turned in one direction for moving said slide in impinging engagement with said spring plate for securing the cutter element on said seat and to be turned in the opposite direction for releasing the cutter element from secured position on said seat.

* * * * *